US008326971B2

(12) United States Patent
Dickerson et al.

(10) Patent No.: US 8,326,971 B2
(45) Date of Patent: Dec. 4, 2012

(54) METHOD FOR USING DYNAMICALLY SCHEDULED SYNTHETIC TRANSACTIONS TO MONITOR PERFORMANCE AND AVAILABILITY OF E-BUSINESS SYSTEMS

(75) Inventors: Scott Stephen Dickerson, Austin, TX (US); James Nicholas Klazynski, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1094 days.

(21) Appl. No.: 11/947,965

(22) Filed: Nov. 30, 2007

(65) Prior Publication Data

US 2009/0144409 A1    Jun. 4, 2009

(51) Int. Cl.
*G06F 15/173* (2006.01)
*G06F 11/00* (2006.01)
(52) U.S. Cl. .............. 709/224; 714/4.1; 714/25; 714/39
(58) Field of Classification Search .................. 709/223, 709/224; 714/1, 4, 25, 39, 47–48, 4.1
See application file for complete search history.

(56) References Cited

U.S. PATENT DOCUMENTS

| | | | | |
|---|---|---|---|---|
| 5,881,237 | A * | 3/1999 | Schwaller et al. | 709/224 |
| 6,108,800 | A * | 8/2000 | Asawa | 714/47 |
| 6,286,046 | B1 * | 9/2001 | Bryant | 709/224 |
| 6,397,359 | B1 * | 5/2002 | Chandra et al. | 714/712 |
| 6,425,009 | B1 * | 7/2002 | Parrish et al. | 709/224 |
| 6,477,483 | B1 * | 11/2002 | Scarlat et al. | 702/186 |
| 6,483,813 | B1 * | 11/2002 | Blencowe | 370/252 |
| 6,564,342 | B2 * | 5/2003 | Landan | 714/48 |
| 6,587,969 | B1 * | 7/2003 | Weinberg et al. | 714/46 |
| 6,799,213 | B1 * | 9/2004 | Zhao et al. | 709/224 |
| 7,111,204 | B1 * | 9/2006 | Couturier et al. | 714/39 |
| 7,481,361 | B2 | 1/2009 | Dickerson et al. | |
| 7,506,047 | B2 * | 3/2009 | Wiles, Jr. | 709/224 |
| 7,543,051 | B2 * | 6/2009 | Greifeneder et al. | 709/224 |
| 7,822,837 | B1 * | 10/2010 | Urban et al. | 709/223 |
| 2002/0052950 | A1 * | 5/2002 | Pillai et al. | 709/224 |
| 2002/0059079 | A1 * | 5/2002 | Negri | 705/1 |
| 2002/0120727 | A1 | 8/2002 | Curley et al. | |
| 2002/0198985 | A1 * | 12/2002 | Fraenkel et al. | 709/224 |
| 2003/0055883 | A1 * | 3/2003 | Wiles, Jr. | 709/203 |
| 2003/0088664 | A1 * | 5/2003 | Hannel et al. | 709/224 |
| 2003/0115266 | A1 * | 6/2003 | Sweet et al. | 709/203 |

(Continued)

FOREIGN PATENT DOCUMENTS

WO    0116753 A    3/2001

(Continued)

*Primary Examiner* — Kevin Bates
*Assistant Examiner* — Robert B McAdams
(74) *Attorney, Agent, or Firm* — Yee & Associates, P.C.; Jeffrey S. LaBaw

(57) ABSTRACT

A method and apparatus is provided for monitoring operations of a specified transaction server that has an associated network topology. One embodiment comprises the steps of defining a plurality of zones within the network topology, and assigning one or more monitoring agents to each of the zones, wherein each agent is adapted to selectively run synthetic transactions with the specified server. The method further comprises monitoring results of successive synthetic transactions carried out by the agents, in order to detect any errors associated with the successive transactions. In response to detecting a performance or an availability problem, selectively, that is associated with a particular synthetic transaction run by a particular one of the agents, one or more agents is dynamically scheduled to run synthetic transactions, wherein each scheduled transaction has a specified relationship with the particular transaction.

19 Claims, 3 Drawing Sheets

U.S. PATENT DOCUMENTS

| | | |
|---|---|---|
| 2003/0191989 A1* | 10/2003 | O'Sullivan .................... 714/47 |
| 2004/0019894 A1 | 1/2004 | Willard et al. |
| 2004/0068560 A1 | 4/2004 | Oulu et al. |
| 2005/0172306 A1 | 8/2005 | Agarwal et al. |
| 2005/0204028 A1* | 9/2005 | Bahl et al. .................... 709/223 |
| 2006/0020924 A1* | 1/2006 | Lo et al. ...................... 717/127 |
| 2006/0085420 A1 | 4/2006 | Hwang |
| 2006/0168467 A1* | 7/2006 | Couturier et al. .............. 714/4 |
| 2007/0266148 A1* | 11/2007 | Ruiz et al. .................... 709/224 |

FOREIGN PATENT DOCUMENTS

| | | |
|---|---|---|
| WO | 2005083571 A | 9/2005 |

\* cited by examiner

METHOD FOR USING DYNAMICALLY SCHEDULED SYNTHETIC TRANSACTIONS TO MONITOR PERFORMANCE AND AVAILABILITY OF E-BUSINESS SYSTEMS

BACKGROUND OF THE INVENTION

1. Field of the Invention

The invention disclosed and claimed herein generally pertains to a method and apparatus for using multiple, dynamically scheduled synthetic transactions to monitor the performance and availability of a transaction server, or other element, of an electronic business (e-business) system. More particularly, the invention pertains to a method of the above type wherein the synthetic transactions are executed by multiple monitoring agents, which are located in different zones of the network topology associated with the e-business system. Even more particularly, the invention pertains to a method of the above type wherein synthetic transactions are scheduled to be run dynamically, upon detecting a problem in the operation of the transaction server or other element of the e-business system.

2. Description of the Related Art

Performance monitors are presently used to capture detailed transaction and application performance data for electronic business and enterprise transactions. Every step of a customer transaction may be monitored as it passes through the network topology of the e-business system. The network topology may comprise an array of links, nodes and other elements, such as hosts, applications, Web and proxy servers, Web transaction servers, database management software, and legacy back-end software. Usefully, characteristic performance and availability data for these network elements is compiled and stored in a data repository, for historical analysis and long-term planning. This data can be compiled by simulating customer transactions, and then collecting performance data resulting therefrom. The collected data may be used to assess the condition of electronic business components and configurations, in order to ensure e-business owners that their web applications are available and meet Service Level Agreement (SLA) targets.

In one approach, performance data as described above is acquired by using performance monitors to record normal business transactions as they occur on the web applications of a given electronic business. A recording component captures performance data from these actual user transactions, as they are respectively executed by elements (e.g., Web servers or Web application servers) of the e-business network topology or environment. A playback component then executes the recorded transactions, in order to simulate actual user activity. These simulated transactions are known as synthetic transactions, and the playback components may be referred to as playback engines. This use of synthetic transactions allows an e-business to understand how transactions are processed by the various elements of the e-business, and such understanding is useful in determining which processes are causing problems and how processes may be improved.

At present, in order to obtain performance and availability data for an e-business transaction server or the like, it is common practice to generate a series of synthetic transactions according to a pre-specified schedule. The data resulting from these transactions is typically reported to a central location. In this process, however, there is a continuing dilemma or challenge in determining the proper frequency at which synthetic transactions should be executed. An administrator must run these transactions on every part or portion of a network of concern, even though the synthetic transactions provide no direct commercial benefit. Thus, generating synthetic transactions at a high frequency produces a correspondingly large amount of unnecessary traffic, which impacts on the back-end application, or other network element, that is being monitored. Excessive traffic of this sort can significantly degrade performance of the e-business system.

However, problems can also be encountered if synthetic transactions are scheduled to occur with too little frequency. Clearly, unnecessary delays can occur in detecting network element faults and errors, if intervals for generating synthetic transactions are too long. Moreover, when data from a synthetic transaction indicates a possible performance or availability problem, it is generally desirable to acquire additional data from other synthetic transactions, in order to confirm the problem and to locate its source. If the frequency for generating synthetic transactions is low, the time spent waiting for this additional data can be excessively long, and thus the discovery of a performance or availability problem will be significantly delayed. Also, it will take longer to obtain performance data from different regions of the network, which may further delay finding the source or location of a problem.

In the past, it has generally been hard to find a frequency for scheduling synthetic transactions that satisfactorily avoids both of these problems.

SUMMARY OF THE INVENTION

A method is provided for monitoring operations of a specified transaction server that has an associated network topology. The method comprises the steps of defining a plurality of zones within the network topology, and assigning one or more monitoring agents to each of the zones, wherein each agent is adapted to selectively run synthetic transactions with the specified server. The method further comprises monitoring results of successive synthetic transactions carried out by the agents, in order to detect any errors or failures associated with the successive transactions. In response to detecting a performance problem or an availability problem, selectively, that is associated with a particular synthetic transaction run by a particular one of the agents, one or more agents is dynamically scheduled to run synthetic transactions, wherein each scheduled transaction has a relationship with the transaction that experienced the problem.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
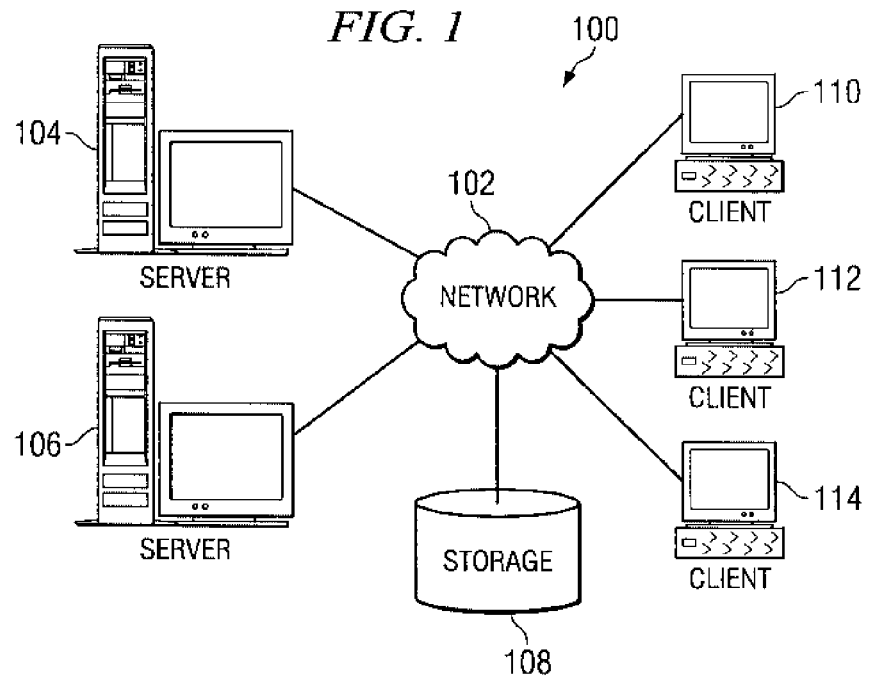
FIG. 1 is a block diagram that shows a distributed network data processing system in which embodiments of the invention may be implemented.
Figure 2:
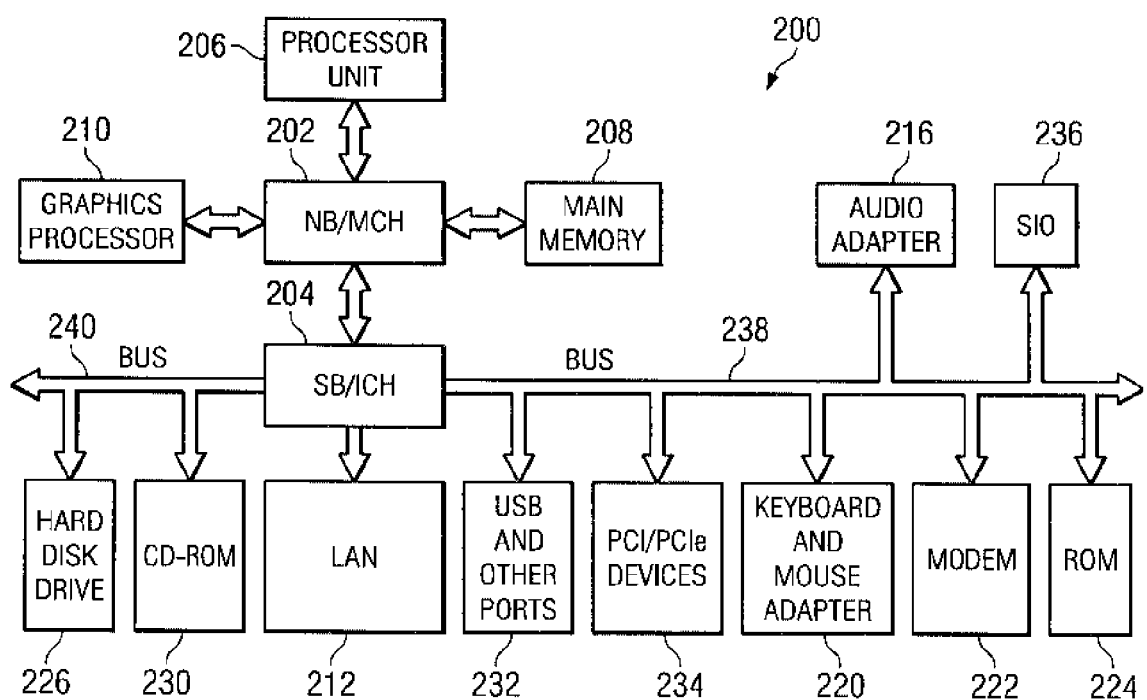
FIG. 2 is a block diagram depicting a data processing system that may be used in implementing embodiments of the invention.

FIGS. 1 and 2 are provided as exemplary diagrams of data processing environments in which embodiments of the present invention may be implemented. FIGS. 1 and 2 are only exemplary, and are not intended to assert or imply any limitation with regard to the environments in which aspects or embodiments of the present invention may be implemented. Many modifications to the depicted environments may be made without departing from the spirit and scope of the present invention.

Referring to FIG. 1, there is shown a pictorial representation of a network of computers or data processing systems in which embodiments of the present invention may be implemented. Network data processing system 100 contains a network 102, which is the medium used to provide communication links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet, with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

Referring to FIG. 2, there is shown a data processing system 200 that may be used in implementing embodiments of the invention. Data processing system 200 is an example of a computer, such as server 104 or client 110 in FIG. 1, in which computer usable code or instructions implementing the processes for embodiments of the present invention may be located.

Data processing system 200 employs a hub architecture including north bridge and memory controller hub (MCH) 202 and south bridge and input/output (I/O) controller hub (ICH) 204. Processing unit 206, main memory 208, and graphics processor 210 are connected to north bridge and memory controller hub 202. Graphics processor 210 may be connected to north bridge and memory controller hub 202 through an accelerated graphics port (AGP).

In data processing system 200, local area network (LAN) adapter 212 connects to south bridge and I/O controller hub 204. Audio adapter 216, keyboard and mouse adapter 220, modem 222, read only memory (ROM) 224, hard disk drive (HDD) 226, CD-ROM drive 230, universal serial bus (USB) ports and other communications ports 232, and PCI/PCIe devices 234 connect to south bridge and I/O controller hub 204 through bus 238 and bus 240. PCI/PCIe devices may include, for example, Ethernet adapters, add-in cards and PC cards for notebook computers. PCI uses a card bus controller, while PCIe does not. ROM 224 may be, for example, a flash binary input/output system (BIOS).

Hard disk drive 226 and CD-ROM drive 230 connect to south bridge and I/O controller hub 204 through bus 240. Hard disk drive 226 and CD-ROM drive 230 may use, for example, an integrated drive electronics (IDE) or serial advanced technology attachment (SATA) interface. Super I/O (SIO) device 236 may be connected to south bridge and I/O controller hub 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java programs or applications executing on data processing system 200 (Java is a trademark of Sun Microsystems, Inc. in the United States, other countries, or both).

As a server, data processing system 200 may be, for example, an IBM eServer™ pSeries® computer system, running the Advanced Interactive Executive (AIX®) operating system or LINUX operating system (eServer, pSeries and AIX are trademarks of International Business Machines Corporation in the United States, other countries, or both while Linux is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as hard disk drive 226, and may be loaded into main memory 208 for execution by processing unit 206. The processes for embodiments of the present invention are performed by processing unit 206 using computer usable program code, which may be located in a memory such as, for example, main memory 208, read only memory 224, or in one or more peripheral devices 226 and 230.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the present invention may be applied to a multiprocessor data processing system.

A bus system may be comprised of one or more buses, such as bus 238 or bus 240 as shown in FIG. 2. Of course the bus system may be implemented using any type of communications fabric or architecture that provides for a transfer of data between different components or devices attached to the fabric or architecture. A communications unit may include one or more devices used to transmit and receive data, such as modem 222 or network adapter 212 of FIG. 2. A memory may be, for example, main memory 208, read only memory 224, or a cache such as found in north bridge and memory controller hub 202 in FIG. 2. Examples depicted by FIGS. 1 and 2 and any other examples described herein are not meant to imply architectural limitations. For example, data processing system 200 also may be a tablet computer, laptop computer, or telephone device in addition to taking the form of a PDA.

Figure 3:
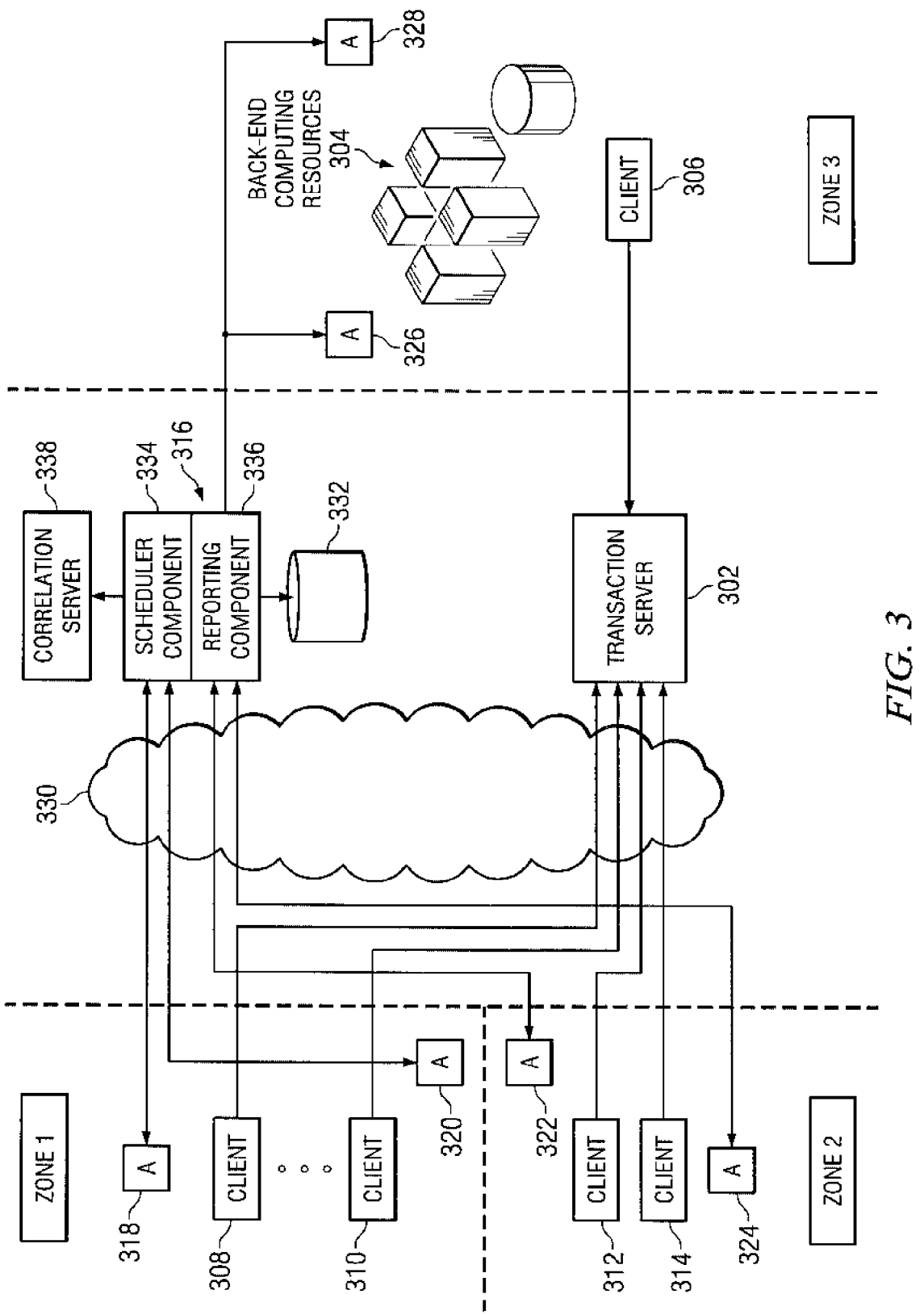
FIG. 3 is a schematic diagram showing a configuration of elements for carrying out electronic business system transactions, together with components for monitoring such transactions in accordance with an embodiment of the invention.

Referring to FIG. 3, there are shown exemplary elements for an electronic business or enterprise system, which includes a transaction server 302 and back-end computing resources 304. Computing resources 304 may comprise a commercial network or other LAN that are connected to transaction server 302 through client device 306. As described hereinafter in further detail, upon detecting a performance or availability problem in the enterprise system, multiple synthetic transactions can be immediately generated automatically. Data produced by these respective transactions is then correlated, in an effort to determine the source of the problem. This immediate correlation capability is a very useful problem solving tool, and provides a significant benefit. As an additional benefit, embodiments of the invention tend to reduce the performance load required by the synthetic transactions.

FIG. 3 further shows exemplary client devices 308-314, which may communicate with transaction server 302 through the Internet 330, in order to obtain access to services provided by the back-end enterprise computing system resources 304. More particularly, client services 308-314 may submit requests to the enterprise system via transaction server 302, thereby causing transactions to be created. The transactions are processed by transaction server 302 and back-end enterprise computing system resources 304. Client devices 308-314 are examples of client devices such as clients 110-114 shown in FIG. 1, and transaction server 302 is an example of a server such as servers 104 and 106 shown therein. Transaction server 302, client 306, and clients 308-314 respectively comprise elements of the network topology of the electronic business system of FIG. 3.

Referring further to FIG. 3, there is shown a monitoring server 316, together with exemplary monitoring agents 318-328. Monitoring server 316 and its agents are generally provided to monitor the processing of transactions by the server 302 and resources 304, and performance and availability data acquired from the monitored transactions is stored in a database 332. Components of transaction server 302 and back-end computing resources 304 may include both hardware and software components, such as host systems, Java Server Pages, servlets, entity beans, data connections and the like.

Each of the above components has its own set of performance characteristics. Accordingly, monitoring server 316 collects and stores data pertaining to these performance characteristics, in order to obtain an indication of how the enterprise system is handling transactions. The collected and stored data relates to performance parameters of the various components of server 302 and back-end computing system resources 304. Examples of these parameters include the amount of time a particular component spends processing a transaction, an SQL query, component information including class name and instance ID in the Java Virtual Machine (JVM), memory usage statistics, and/or properties of the system in general.

In addition to collecting performance data, monitoring server 316 also monitors and acquires data pertaining to the availability of transaction server 302. Clearly, availability of the transaction server is of paramount importance to the enterprise system, since no electronic business can be conducted without the server. As used herein, availability generally refers to the availability and performance of a certain transaction. That is, if the transaction experiences an interruption, this transaction is experiencing an availability problem. The actual issue could be the transaction server, the database, or the router. Usefully, performance data and availability is organized according to the different types of transactions for which the data is acquired. Alternatively or additionally, the data is organized according to the different components that are operated or exercised, by synthetic transactions generated to acquire the data.

The transaction monitoring efforts of server 316 are assisted by monitoring agents 318-328, which respectively comprise synthetic transaction playback engines. From previously collected performance data, transactions derived from actual past transactions are recorded and stored in database 332. Monitoring server 316 sends transaction playback schedules and transaction specifics to synthetic transaction playback agents 318-328, so that the agents will play back synthetic transactions that comprise specified recorded transactions. Scheduling of respective synthetic transactions is carried out in accordance with embodiments of the invention, as described hereinafter in further detail. When a given agent 318-328 is required to play back a particular synthetic transaction, the agent pulls the particular transaction from database 332 and proceeds to execute it. Moreover, the agent monitors performance data produced in response to execution of the synthetic transaction, and sends such performance data to monitoring server 316. A common type of synthetic transaction comprises a sequence of URLs, which identify respective web applications or the like.

In accordance with embodiments of the invention, FIG. 3 shows the network topology of the depicted electronic business system partitioned into multiple zones, such as zones 1, 2 and 3. Moreover, a plurality of playback agents is placed in each zone. Thus, agents 318 and 320 are in the same zone as clients 308 and 310, agents 322 and 324 are in the same zone as clients 312 and 314, and agents 326 and 328 are in the same zone as client 306 and back-end computing resources 304. While FIG. 3 shows three zones, the invention is by no means limited thereto. However, it is important for monitoring server 316 to know the zone that each agent 318-328 is located in or associated with.

Consistent with embodiments of the invention, different reasons or criteria may be used to select or establish the respective network zones. For example, clients communicating through transaction server 302 through different Internet service providers (ISP) may be included in different zones. Alternatively, different zones could be apportioned to different large customers of the e-business system, or zones could respectively correspond to customers from different cities or from different countries. Also, client 306 and back-end computing resources 304 could be in an enterprise network that defined one zone, while the Internet defined another zone. In some embodiments, users could define their own customized zones at the monitoring server, based on an expression that matches the network address.

FIG. 3 shows monitoring server 316 comprising a scheduler component 334 and a reporting component 336, and further shows a correlation server 338 receiving data from monitoring server 316. In other embodiments, the correlation server could be incorporated into monitoring server 216. It is to be understood that scheduler 334 performs a very important function in embodiments of the invention, by dynamically scheduling operation of respective monitoring agents 318-328, as required. More specifically, when it appears that there are no faults or errors in electronic business system transactions, scheduler 334 operates respective agents in a normal mode. In the normal mode of operation, a minimal number of agents are scheduled to execute synthetic transactions at a given time, and the frequency of execution is comparatively low. This enables the overhead of synthetic transaction executions to be kept low, during normal mode operation. As an example, every 15 minutes in normal mode an agent in one of four different zones would execute a synthetic transaction, directed to transaction server 302.

FIG. 3 further shows an administrator client 340 connected to scheduler component 334, to interact therewith. Client 340 may comprise a computer or data processing system that is operated by a human administrator for the electronic business system of FIG. 3. The administrator can thus use client 340 to obtain data relating to problems and other conditions in the system, as collected by monitoring server 316 and its respective agents. The client 340 can also be used by the administrator to set schedules for normal mode operation, and to furnish other rules and constraints to the system.

When data resulting from a synthetic transaction indicates a problem, such as a performance failure or unavailability of the transaction server, the scheduler 334 quickly goes into a dynamic scheduling mode. Thus, the normal or scheduled mode for generating synthetic transactions is overridden. In the dynamic mode, scheduler 334 will immediately direct other agents to perform synthetic transactions that have some connection or relationship to the detected fault or error. Data from these additional transactions is collected by the agents, and sent to correlation server 338 through monitoring server 316. Server 338 then correlates the data, in an effort to determine the extent of the problem, and to further determine whether the problem is limited to a particular section of the network topology of the e-business. Thus, an immediate correlation capability is automatically put into use, to provide valuable assistance in detecting the cause of the problem.

In one approach for the dynamic scheduling mode, if a given synthetic transaction results in detection of an availability or performance failure in one of the zones, then the same synthetic transaction is immediately played back from one agent in each of the other zones. If all of the other zones experience this availability failure, then it can be concluded that this failure is not due to network problems related to a particular part of the system network topology. Rather, the failure is due to either a network-wide availability problem or an availability problem at the transaction server. On the other hand if the failure seems limited to one of the zones, then the given synthetic transaction is dynamically scheduled for execution on a different agent in that same zone. Data resulting from this execution can be used to ensure that the problem was not related to the particular monitoring agent that initially detected the problem.

If it appears that the problem is related to the transaction server, after correlation of data provided by the dynamically scheduled synthetic transactions has been carried out, then the monitoring server can identify other e-business transactions that previously utilized the same transaction server. This can be done by analyzing recorded transactions previously stored in database 332, for commonalities in the URLs. These transactions can immediately be requested and played back, in order to determine how widespread the problem may be.

The above discussion illustrates how embodiments of the invention can provide a two axis approach of data correlation. One axis pertains to acquiring data from synthetic transactions that are initiated from a number of different agent locations. The second axis refers to the use of different but related synthetic transactions to acquire data. For example, a transaction to order a book from the enterprise shown in FIG. 3, and a transaction to cancel a book order, could rely on the same components or infrastructure. Thus, if there was a problem with an order transaction it would be useful to dynamically schedule a synthetic cancel transaction, to see if the same problem was detected.

Another example of related transactions would be secure and nonsecure versions of a particular transaction. Both versions would use the same database. Thus, if there was a problem with the database, synthetic transactions for both versions would be seen to fail.

Reporting component 336 provides a means for notifying an administrator or other user of conditions and events occurring in transactions of the e-business system. For example, after the correlation server 338 has reached a conclusion as to the source of a problem, this information can be presented by the reporting component 336 to a contact person who is identified as a first responder. The information can then be used to implement a solution to the problem. The reporting component can also be queried by a user, such as to indicate system availability according to the results from a series of recent synthetic transactions.

Figure 4:
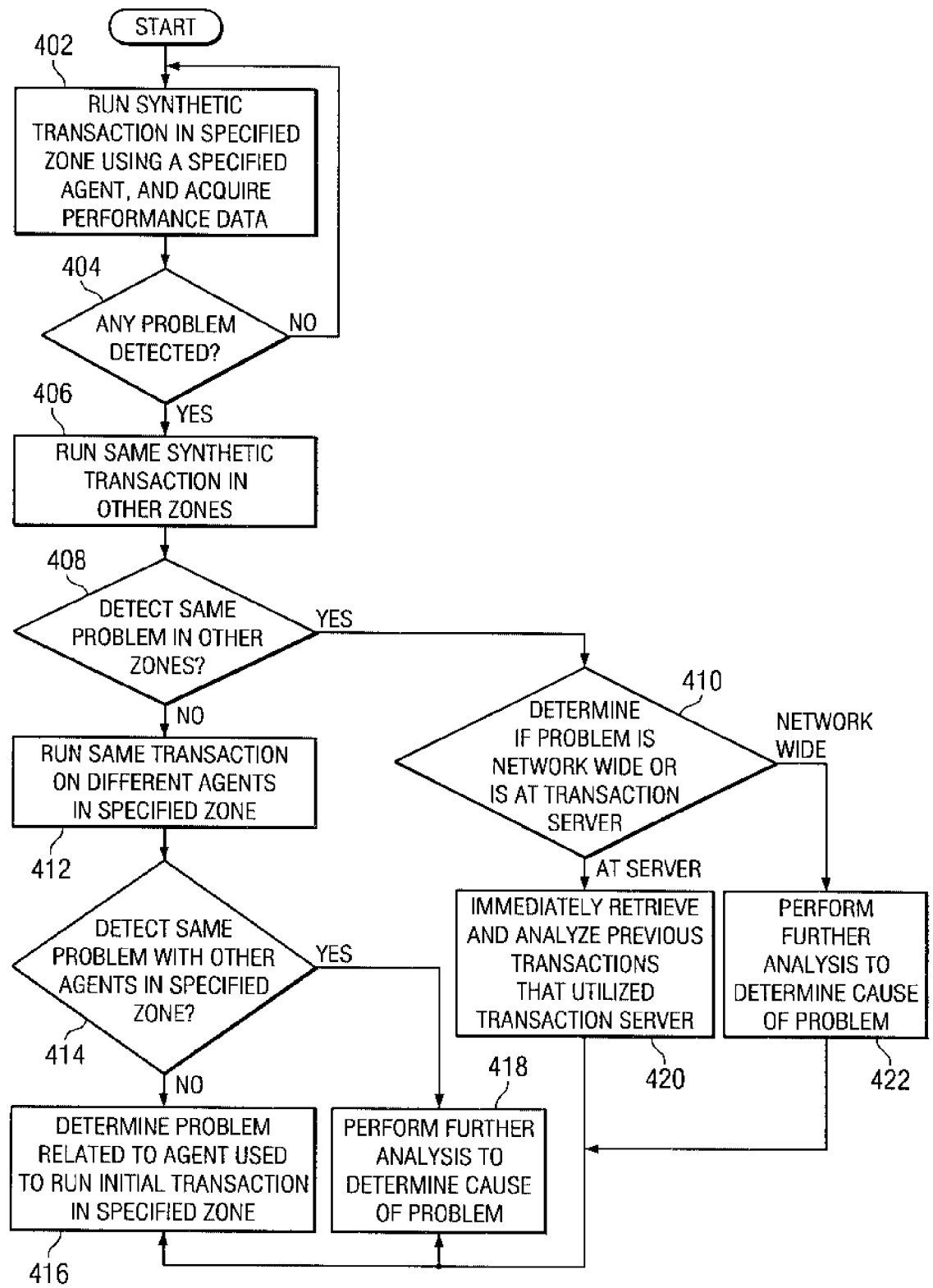
FIG. 4 is a flowchart showing principal steps for an exemplary embodiment of the invention.

Referring to FIG. 4, there are shown principal steps for a method or procedure in accordance with an embodiment of the invention. At step 402, a specified monitoring agent is operated in a normal mode, as described above in connection with FIG. 3, to run a synthetic transaction in a specified zone. The specified agent may be directed by its monitoring agent to execute a synthetic transaction every 15 minutes, by way of example. At step 404, data produced by the synthetic transaction of step 402 is analyzed, in order to detect any problem or failure associated with such transaction. If no problem is found, the procedure returns to step 402. Otherwise, step 406 is carried out.

At step 406, the monitoring server responds to detection of a problem by dynamically scheduling the synthetic transaction of step 402 to be immediately run in one or more zones other than the specified zone. In a useful embodiment, a dynamically scheduled synthetic transaction is run immediately, if it is executed within a very brief time. Such brief time can be on the order of minutes, following detection of a problem or failure. After running the dynamically scheduled synthetic transactions, it is determined at step 408 whether the same problem was detected in other zones besides the specified zone. If the result of this query is positive, the procedure is routed to step 410, to determine whether the problem is network wide or is at the transaction server.

If step 408 produces a negative result, the monitoring server dynamically schedules the synthetic transaction of step 402 to run on one or more agents in the specified zone, other than the specified agent. This is indicated by step 412. Step 414 seeks to decide whether the problem was detected by agents in the specified zone, other than the specified agent. If not, it is concluded at step 416 that the problem is associated with the specified agent. Otherwise, as shown by step 418 further analysis is performed to determine the cause of the problem.

If the determination of step 410 indicates that there is a problem with the transaction server, previous transactions that utilized the transaction server are immediately retrieved and analyzed. This is shown by step 420. On the other hand, if the problem is determined to be network wide, further analysis is performed at step 422, to determine the cause of the problem.

The invention can take the form of an entirely hardware embodiment, an entirely software embodiment or an embodiment containing both hardware and software elements. In a preferred embodiment, the invention is implemented in software, which includes but is not limited to firmware, resident software, microcode, or the like.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Further, a computer storage medium may contain or store a computer readable program code such that when the computer readable program code is executed on a computer, the execution of this computer readable program code causes the computer to transmit another computer readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for monitoring operations of a specified transaction server that has an associated network topology, wherein said method comprises the steps of:
    defining a plurality of zones within said network topology;
    assigning one or more monitoring agents to each of said zones, wherein each agent is adapted to selectively run synthetic transactions with said specified transaction server;
    monitoring results of successive synthetic transactions carried out by said monitoring agents, in order to detect any errors associated with said successive synthetic transactions; and
    in response to detecting a problem associated with a particular synthetic transaction run by a particular one of said monitoring agents, a normal mode of operation, wherein said monitoring agents are respectively scheduled to run said synthetic transactions at pre-specified times, is overridden and a dynamic scheduling mode is invoked wherein certain ones of said monitoring agents are respectively scheduled to run said additional synthetic transactions immediately following detection of said problem associated with said particular synthetic transaction, wherein each additional scheduled transaction is selected because of a specified relationship with said particular synthetic transaction.

2. The method of claim 1, wherein:
    results of each of said scheduled additional synthetic transactions are selectively correlated with one another, in order to determine the cause of said detected problem.

3. The method of claim 1, wherein:
    said scheduled additional synthetic transactions are respectively run immediately, following detection of said problem associated with said particular synthetic transaction.

4. The method of claim 1, wherein:
    said scheduling and correlating tasks are carried out by a monitoring server connected to each of said monitoring agents, wherein said monitoring server sends transaction playback schedules to certain ones of said monitoring agents that indicate when to run at least one given synthetic transaction.

5. The method of claim 1, wherein:
    said correlated results and said determined cause are presented to a user of said specified transaction server.

6. A method for monitoring operations of a specified transaction server that has an associated network topology, wherein said method comprises the steps of:
    defining a plurality of zones within said network topology;
    assigning one or more monitoring agents to each of said zones, wherein each agent is adapted to selectively run synthetic transactions with said specified transaction server;
    monitoring results of successive synthetic transactions carried out by said monitoring agents, in order to detect any errors associated with said successive synthetic transactions; and
    in response to detecting a problem associated with a particular synthetic transaction run by a particular one of said monitoring agents, a normal mode of operation, wherein said monitoring agents are respectively scheduled to run said synthetic transactions at pre-specified times, is overridden and a dynamic scheduling mode is invoked wherein certain ones of said monitoring agents are respectively scheduled to run said additional synthetic transactions immediately following detection of said problem associated with said particular synthetic transaction, wherein each scheduled transaction has a specified relationship with said particular synthetic transaction, wherein certain ones of said monitoring agents are scheduled to run said particular synthetic transaction in each of said zones, other than the zone to which said particular agent is assigned.

7. The method of claim 1, wherein:
    one or more monitoring agents assigned to a same zone as said particular agent are respectively scheduled to run said particular synthetic transaction responsive to determining that the problem was not detected by other monitoring agents running said particular synthetic transaction.

8. The method of claim 1, wherein:
    said detected failure is determined to be caused by said specified server, and information pertaining to previous transactions utilizing said specified server are retrieved and selectively analyzed responsive to determining that the problem was not detected by other monitoring agents running said particular synthetic transaction in same zone as the particular one of the monitoring agents that detected the problem.

9. The method of claim 1, wherein:
said monitored results of said successive synthetic transactions are stored at a specified location, and used in analyzing subsequent detected errors associated with synthetic transactions.

10. The method of claim 1, wherein:
one or more of said monitoring agents are dynamically scheduled to run synthetic transactions that are each known to use infrastructure that is common to said particular synthetic transaction.

11. A computer program product executable in a non-transitory computer readable medium for monitoring operations of a specified transaction server that has an associated network topology, wherein said computer program product comprises:
instructions for defining a plurality of zones within said network topology;
instructions for assigning one or more monitoring agents to each of said zones, wherein each agent is adapted to selectively run synthetic transactions with said specified transaction server;
instructions for monitoring results of successive synthetic transactions carried out by said monitoring agents, in order to detect any errors associated with said successive synthetic transactions; and
instructions responsive to detecting a problem associated with a particular synthetic transaction run by a particular one of said monitoring agents, a normal mode of operation, wherein said monitoring agents are respectively scheduled to run said synthetic transactions at pre-specified times, is overridden and a dynamic scheduling mode is invoked wherein certain ones of said monitoring agents are respectively scheduled to run said additional synthetic transactions immediately following detection of said problem associated with said particular synthetic transaction, wherein each additional scheduled transaction is selected because of a specified relationship with said particular synthetic transaction.

12. The computer program product of claim 11, wherein:
results of each of said scheduled additional synthetic transactions are selectively correlated with one another, in order to determine the cause of said detected problem.

13. The computer program product of claim 11, wherein:
said scheduled additional synthetic transactions are respectively run immediately, following detection of said error associated with said particular synthetic transaction.

14. A computer program product executable in a non-transitory computer readable medium for monitoring operations of a specified transaction server that has an associated network topology, wherein said computer program product comprises:
instructions for defining a plurality of zones within said network topology;
instructions for assigning one or more monitoring agents to each of said zones, wherein each agent is adapted to selectively run synthetic transactions with said specified transaction server;
instructions for monitoring results of successive synthetic transactions carried out by said monitoring agents, in order to detect any errors associated with said successive synthetic transactions; and
instructions responsive to detecting a problem associated with a particular synthetic transaction run by a particular one of said monitoring agents, a normal mode of operation, wherein said monitoring agents are respectively scheduled to run said synthetic transactions at pre-specified times, is overridden and a dynamic scheduling mode is invoked wherein certain ones of said monitoring agents are respectively scheduled to run said additional synthetic transactions immediately following detection of said problem associated with said particular synthetic transaction, wherein each scheduled transaction has a specified relationship with said particular synthetic transaction, wherein certain ones of said monitoring agents are scheduled to run said particular synthetic transaction in each of said zones, other than the zone to which said particular agent is assigned.

15. The computer program product of claim 11, wherein:
one or more monitoring agents assigned to a same zone as said particular monitoring agent are respectively scheduled to run said particular synthetic transaction responsive to determining that the problem was not detected by other monitoring agents running said particular synthetic transaction.

16. A data processing system for monitoring operations of a specified transaction server that has an associated network topology, wherein said data processing system comprises:
a data processor and a memory coupled to the data processor;
a plurality of monitoring agents, each assigned to one of a plurality of zones within said network topology, wherein each agent is adapted to selectively run synthetic transactions with said specified transaction server;
program code in the memory and operable by the data processor to perform steps of:
monitoring results of successive synthetic transactions carried out by said monitoring agents, in order to detect any errors associated with said successive synthetic transactions; and
responsive to detecting a problem associated with a particular synthetic transaction run by a particular one of said monitoring agents, a normal mode of operation, wherein said monitoring agents are respectively scheduled to run said synthetic transactions at pre-specified times, is overridden and a dynamic scheduling mode is invoked wherein certain ones of said monitoring agents are respectively scheduled to run said additional synthetic transactions immediately following detection of said problem associated with said particular synthetic transaction, wherein each additional scheduled transaction is selected because of a specified relationship with said particular synthetic transaction.

17. The data processing system of claim 16, wherein:
said program code is further operable to correlate the results of said scheduled additional synthetic transactions with one another, in order to determine the cause of said detected problem.

18. The data processing system of claim 16, wherein:
said scheduled additional synthetic transactions are respectively run immediately, following detection of said error associated with said particular synthetic transaction.

19. The data processing system of claim 16, wherein:
said scheduling and correlating tasks are carried out by a monitoring server connected to each of said monitoring agents, wherein said monitoring server sends transaction playback schedules to certain ones of said monitoring agents that indicate when to run at least one given synthetic transaction.

* * * * *